(12) United States Patent  (10) Patent No.: US 7,861,276 B2
Moroo                      (45) Date of Patent: Dec. 28, 2010

(54) VIDEO PROGRAM BROADCASTING APPARATUS, METHOD, AND PROGRAM WHICH STEGANOGRAPHICALLY EMBEDS USE INFORMATION

(75) Inventor: Jun Moroo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1504 days.

(21) Appl. No.: 10/642,147

(22) Filed: Aug. 18, 2003

(65) Prior Publication Data

US 2004/0045034 A1 Mar. 4, 2004

(30) Foreign Application Priority Data

Aug. 30, 2002 (JP) .............................. 2002-253148

(51) Int. Cl.
H04N 7/173 (2006.01)
H04N 7/16 (2006.01)

(52) U.S. Cl. ...................................... 725/113; 725/136
(58) Field of Classification Search ............. 725/94–97, 725/112–113, 136
See application file for complete search history.

(56) References Cited

U.S. PATENT DOCUMENTS

| 5,862,450 | A * | 1/1999 | Mandal et al. | 725/91 |
| 6,018,768 | A * | 1/2000 | Ullman et al. | 709/218 |
| 6,061,719 | A * | 5/2000 | Bendinelli et al. | 709/218 |
| 6,411,725 | B1 * | 6/2002 | Rhoads | 382/100 |
| 6,415,438 | B1 * | 7/2002 | Blackketter et al. | 725/136 |
| 6,430,743 | B1 * | 8/2002 | Matsuura | 725/112 |
| 6,502,243 | B1 * | 12/2002 | Thomas | 725/110 |
| 6,542,927 | B2 * | 4/2003 | Rhoads | 709/217 |
| 7,197,708 | B1 * | 3/2007 | Frendo et al. | 715/718 |
| 7,420,584 | B2 * | 9/2008 | Ritchie | 348/61 |
| 2002/0016820 | A1 * | 2/2002 | Du Val et al. | 709/203 |
| 2002/0095687 | A1 * | 7/2002 | Shintani et al. | 725/112 |
| 2002/0124262 | A1 * | 9/2002 | Basso et al. | 725/109 |
| 2002/0124263 | A1 * | 9/2002 | Yokomizo | 725/112 |
| 2002/0162115 | A1 * | 10/2002 | Bruckner et al. | 725/105 |
| 2002/0162118 | A1 * | 10/2002 | Levy et al. | 725/110 |
| 2002/0188699 | A1 * | 12/2002 | Ullman et al. | 709/219 |
| 2004/0139474 | A1 * | 7/2004 | Carro | 725/112 |

FOREIGN PATENT DOCUMENTS

| JP | 9-298721 | 11/1997 |
| JP | 2000-101979 | 4/2000 |
| JP | 2001-292427 | 10/2001 |

OTHER PUBLICATIONS

Japanese Patent Office Action mailed Oct. 2, 2007 for corresponding Japanese Patent Application No. 2002-253148.

* cited by examiner

Primary Examiner—Scott Beliveau
Assistant Examiner—Alexander Q Huerta
(74) Attorney, Agent, or Firm—Staas & Halsey LLP

(57) ABSTRACT

A video program broadcasting apparatus includes a program table storage unit and a program-URL matching table storage unit. The URL of a video program which is being broadcasted at the present is acquired by a URL generation unit with respect to a plurality of video programs which are sequentially broadcasted depending on the time schedule of a video program table. The URL of the video program which is being broadcasted at the present and the URLs of video programs which were broadcasted are invisibly embedded by steganography. The video program URL is converted into a simple code, and the code is invisibly embedded by steganography in a video program which is being broadcasted.

26 Claims, 19 Drawing Sheets

| PROGRAM | URL |
|---|---|
| PROGRAM 1 | URL1 |
| PROGRAM 2 | URL2 |
| PROGRAM 3 | URL3 |
| PROGRAM 4 | URL4 |
| PROGRAM 5 | URL5 |
| PROGRAM 6 | URL6 |
| PROGRAM 7 | URL7 |
| PROGRAM 8 | URL8 |

FIG. 11A

| NUMBER CODE | PROGRAM URL |
|---|---|
| CODE 1 | URL1 |
| CODE 2 | URL2 |
| CODE 3 | URL3 |
| CODE 4 | URL4 |
| CODE 5 | URL5 |
| CODE 6 | URL6 |
| CODE 7 | * |
| CODE 8 | * |

FIG. 11B

| NUMBER CODE | PROGRAM URL |
|---|---|
| CODE 1 | * |
| CODE 2 | * |
| CODE 3 | URL3 |
| CODE 4 | URL4 |
| CODE 5 | URL5 |
| CODE 6 | URL6 |
| CODE 7 | URL7 |
| CODE 8 | URL8 |

FIG. 16

| NUMBER CODE | PRESENT PROGRAM URL | PREVIOUS PROGRAM URL |
|---|---|---|
| CODE 1 | URL1 | |
| CODE 2 | URL1 | |
| CODE 3 | URL2 | URL1 |
| CODE 4 | URL2 | |
| CODE 5 | URL3 | URL2 |
| CODE 6 | URL3 | |
| CODE 7 | * | * |
| CODE 8 | * | * |

VIDEO PROGRAM BROADCASTING APPARATUS, METHOD, AND PROGRAM WHICH STEGANOGRAPHICALLY EMBEDS USE INFORMATION

BACKGROUND OF THE INVENTION

1. Field of the Invention

The present invention relates to a video program broadcasting apparatus, method, and program used in TV broadcast or video playing on a street and, more particularly, to a video program broadcasting apparatus, method, and program which can easily acquire use information such as the URL of a sponsor from a broadcast program.

2. Description of the Related Arts

In recent years, on TV broadcasting or video playing on a street, a method of displaying the URL of a homepage on the Internet on a screen of a commercial program to guide potential buyers is frequently used. As a method of using the URL displayed on a video program screen, the following method is used. That is, when a user wants to know further detailed information, the user notes or memorizes a URL which is an access destination of the Internet displayed on a video program and performs a URL access operation and an operation for starting a WWW browser to access the homepage of the URL.

However, in a conventional method of displaying a URL on a video program screen to cause a user to a homepage, a URL of the Internet displayed on a video program must be memorized or noted by the user.

However, since a time for displaying the URL on the video program is relatively short, it is difficult to memorize or note the URL. Even if the URL can be memorized or noted, mistakes may be made in the URL to cause many erroneous accesses to the homepage.

The display of the URL on the video program screen is small at a corner of the screen to prevent a movie of a commercial program from being blocked, so that the display of the URL itself cannot be easily seen.

When the display of the URL is increased in size to solve this problem, the original commercial program is largely blocked, and the display of a URL and a commercial program cannot be easily compatible. As a method of solving the problem, as disclosed in Japanese Unexamined Patent Publication No. 2000-101979, a method which embeds a URL between vertical retrace lines of a television broadcast screen, acquires the URL through a dedicated teletext broadcasting receiver, and causes a user to access a homepage or the like is proposed.

However, according to this method, the television receiver requires a function of decoding teletext broadcasting and an internet access function. Such a special television receiver has a complex configuration and is low in cost. The television receiver is lack in practicality of use of a URL by a personal computer.

SUMMARY OF THE INVENTION

According to the present invention a video program broadcasting apparatus, method, and program which can easily acquire use information of a URL or the like from a video program screen of television broadcasting, video playing on a street, or the like without any mistake and prevents a program movie from being blocked by the use information are provided.

(Apparatus)

The present invention is a video program broadcasting apparatus for sequentially broadcasting a plurality of video programs depending on a time schedule of a video program table, includes a matching table storage unit (a program table storage unit and a program-URL matching table storage unit) in which a matching table of pieces of use information inherent in a plurality of video programs to be broadcasted, and a use information embedding unit (URL generation unit) for acquiring use information of a video program which is being broadcasted at the present with reference to the matching table and invisibly embedding use information of a video program which is being broadcasted and pieces of use information of video programs which were broadcasted in a time zone of the present broadcast video program. For this reason, the user information such as a URL is invisibly embedded in a video program video image, the URL does not block the video program video image.

A user photographs a video program video image by a built-in camera of a mobile telephone or the like and automatically acquires use information such as a URL embedded in the video program video image by using a restoring program of a personal computer, so that the user can easily and reliably access a homepage. In this case, a use information embedding unit invisibly embeds the use information in broadcast image data by steganography. The use information embedding unit, invisibly embeds use information of a video program which was previously broadcasted in a time zone at the start of a video program which is being broadcasted at the present, and invisibly embeds use information of the video program which is being broadcasted at the present in the remaining time zone. For this reason, even though the present video program is switched to the next video program in a photographing operation of the screen by a camera, the URL of the previous video program which is embedded in the first time zone after the video programs are switched. The use information embedding unit, invisibly embeds use information of a video program which was previously broadcasted and use information of a video program which is being broadcasted at the present in a time zone at the start of the video program which is being broadcasted at the present, and invisibly embeds only the use information of the video program which is being broadcasted at the present in the remaining time zone. For this reason, a user can acquire both the URL of the previous video program and the URL of the video program which is being broadcasted at the present, and can selectively use the two URLs.

The matching table storage unit stores a URL matching table of a URL inherent in a video program, and the use information embedding unit acquires the URL of a video program which is being broadcasted at the present with reference to the matching table and invisibly embeds the URL of the video program which is being broadcasted at the present and the URLs of video programs which were broadcasted in a time zone of the present broadcast video program.

The matching table storage unit stores a URL matching table of a URL inherent in a video program and a code matching table of a code inherent in the URL, and the use information embedding unit acquires a code matched to the URL of the video program which is being broadcasted at the present with reference to the URL matching table and the code matching table and invisibly embeds the code of the video program which is being broadcasted at the present and the codes of video programs which were broadcasted in a time zone of the present broadcast program. In this manner, the URL is not directly embedded, and the URL is converted into a simple code and then embedded, so that the load of embedding and restoring processes can be reduced.

The code matching table prepares codes the number of which is smaller than the number of video programs, and the use information embedding unit searches for an unused code to set a URL matched to a video program and recovers the URL into the unused code a predetermined period of time after the video program ends to reuse the unused code.

The video program broadcasting apparatus further includes a server which acquires a URL with reference to the code matching table when a code conversion request is received from an outside circuit to respond to the outside circuit. In this manner, the load for acquiring a URL from a embedded code can be reduced on a user side. A signal of a broadcast program output from the use information embedding unit is transmitted to an outside circuit as a television broadcasting signal to cause the outside circuit to receive and display a video program screen, and the embedded use information is restored by photographing the received and displayed video program screen to cause the outside circuit to use the use information. A signal of a broadcasting video program output from the use information embedding unit is recorded on a recording medium to cause another device to reproduce and display the video program screen, and the embedded use information is restored by photographing the received and displayed video program screen to cause the device to use the use information.

(Method)

The present invention provides a video program broadcasting method. This video program broadcasting method includes:

the video program broadcasting step of sequentially broadcasting a plurality of video programs depending on a time schedule of a video program table from a video program broadcasting apparatus; and the use information embedding step of using a use information embedding unit to acquire use information of a video program which is being broadcasted at the present with reference to a matching table in which pieces of use information inherent in the plurality of video programs are stored and invisibly embedding the use information of the video program which is being broadcasted at the present and use information of a video program which was broadcasted in a time zone of the present video program. The details of the video program broadcasting method are basically the same as those of the video program broadcasting apparatus.

(Program)

The present invention causes a computer for broadcasting a video program to execute:

the video program broadcasting step of sequentially broadcasting a plurality of video programs from a video program broadcasting apparatus depending on a time schedule of a video program table; and the use information embedding step of acquiring use information of a video program which is being broadcasted at the present with reference to a matching table in which pieces of use information inherent in the plurality of video programs are stored and invisibly embedding the use information of the video program which is being broadcasted at the present and use information of a video program which was broadcasted in a time zone of the present video program. The details of the program are basically the same as those of the video program broadcasting apparatus.

The above and other objects, features, and advantages of the present invention will become more apparent from the following detailed description with reference to the drawings.

BRIEF DESCRIPTION OF DRAWINGS

FIG. 4 is a diagram for explaining a program-URL matching table used in FIG. 1;

FIGS. 11A and 11B are diagrams for explaining an embodiment of a code table used in FIG. 10;

FIG. 16 is a diagram for explaining an embodiment of the code table in FIG. 10 used in code embedding in FIG. 15;

DETAILED DESCRIPTION OF THE PREFERRED EMBODIMENT

Figure 1:
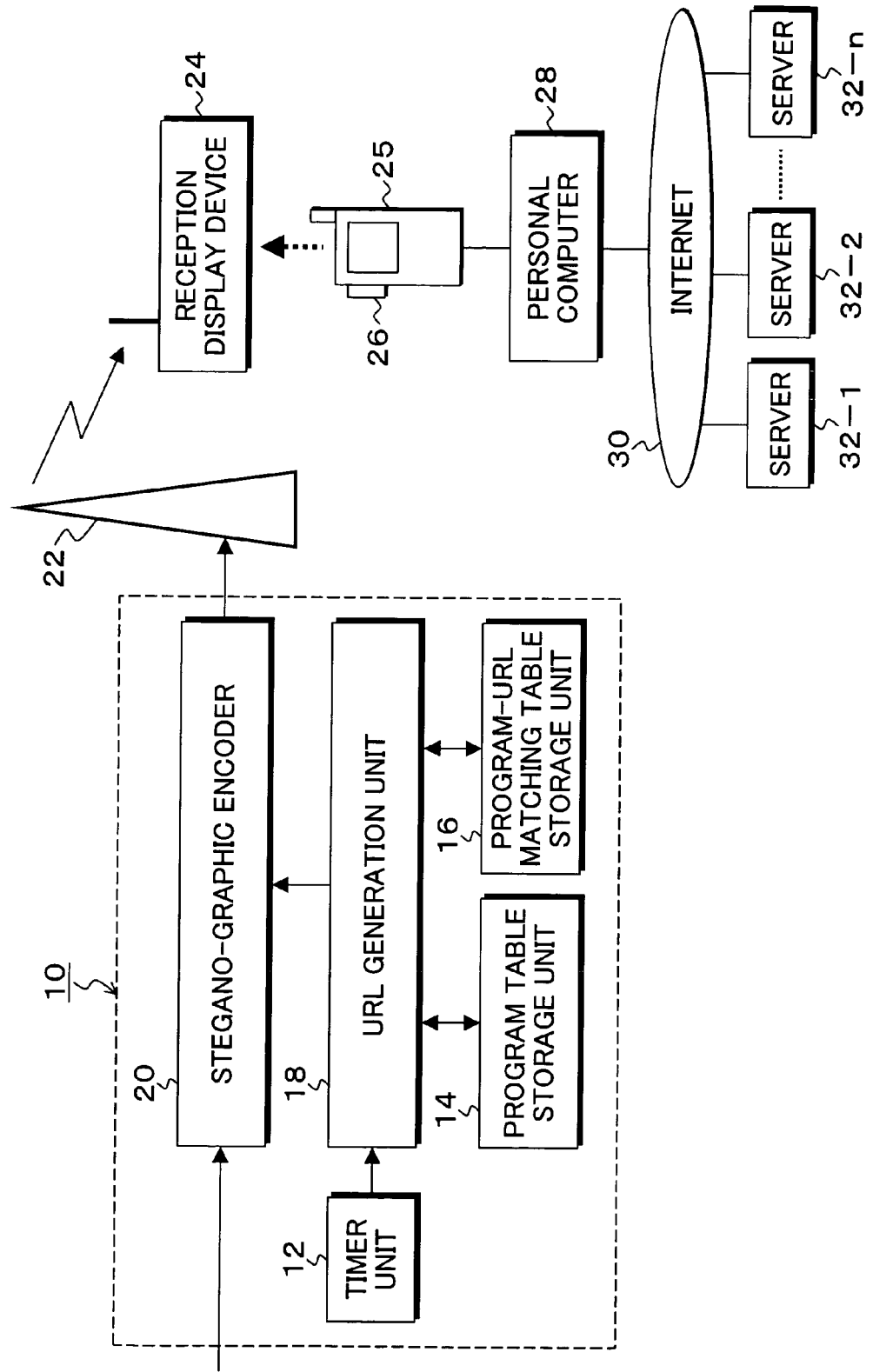
FIG. 1 is a diagram for explaining an embodiment of a video program broadcasting apparatus according to the present invention in which a URL is embedded in a video program broadcast and a system environment.

FIG. 1 is a diagram for explaining a system environment of a broadcasting system to which a video program broadcasting apparatus according to the present invention is applied. In FIG. 1, a video program broadcasting apparatus 10 according to the present invention is installed in a broadcast station or the like. The video program broadcasting apparatus 10 inputs a broadcasting signal by a broadcast depending on a video program table of a video program which has been produced, invisibly embeds a URL which is use information inherent in each video program and which is used in access to a homepage on the Internet in image data of the video program by steganography, and outputs the image output. The broadcast signal in which the use information such as a URL is embedded in the video program broadcasting apparatus 10 is transmitted as a television electric wave by a television transmission equipment 22 to display the image of the signal on a receiving display device 24. The video program broadcasting apparatus 10 comprises a timer unit 12 for outputting time information, a program table storage unit 14 in which a video program table is stored, a program-URL matching table storage unit 16 in which a program-URL matching table is stored, and a URL generation unit 18, and a steganography encoder 20.

Of these units, the URL generation unit 18 and the steganography encoder 20 constitute a use information embedding unit which acquires a URL of a video program which is being broadcasted at the present with reference to a video program table and a program-URL matching table which are related to a URL serving as use information of the video program which is being broadcasted at the present to invisibly embed the URL in the video program which is being broadcasted. As a concrete embedding method by the steganography encoder 20, a method disclosed in a drawing of the specification of U.S. Pat. No. 5,841,978 is used. As a matter of course, a known embedding method using steganography can also be used. A video program screen of a broadcast program in which the URL displayed on the receiving display device 24 is invisibly embedded is photographed by a mobile telephone 25 having a camera 26, and the photographed screen is downloaded in a personal computer 28 held by a user. The embedded URL is restored from the photographed screen by a steganography restoring application program installed in the personal computer 28. A user access, e.g., a server 32-1 which provides video program use information from the Internet 30 by using the restored URL, and can browse the homepage of the URL. In an actual video program broadcast, for example, in commercial broadcasting, a URL is invisibly embedded in a commercial screen of a video program. The commercial screen is photographed by the camera 26 of the mobile telephone 25, and the URL embedded in the screen is restored by the personal computer 28, so that a user accesses a corresponding server to browse the homepage or the like of the sponsor of the video program.

Figure 2:
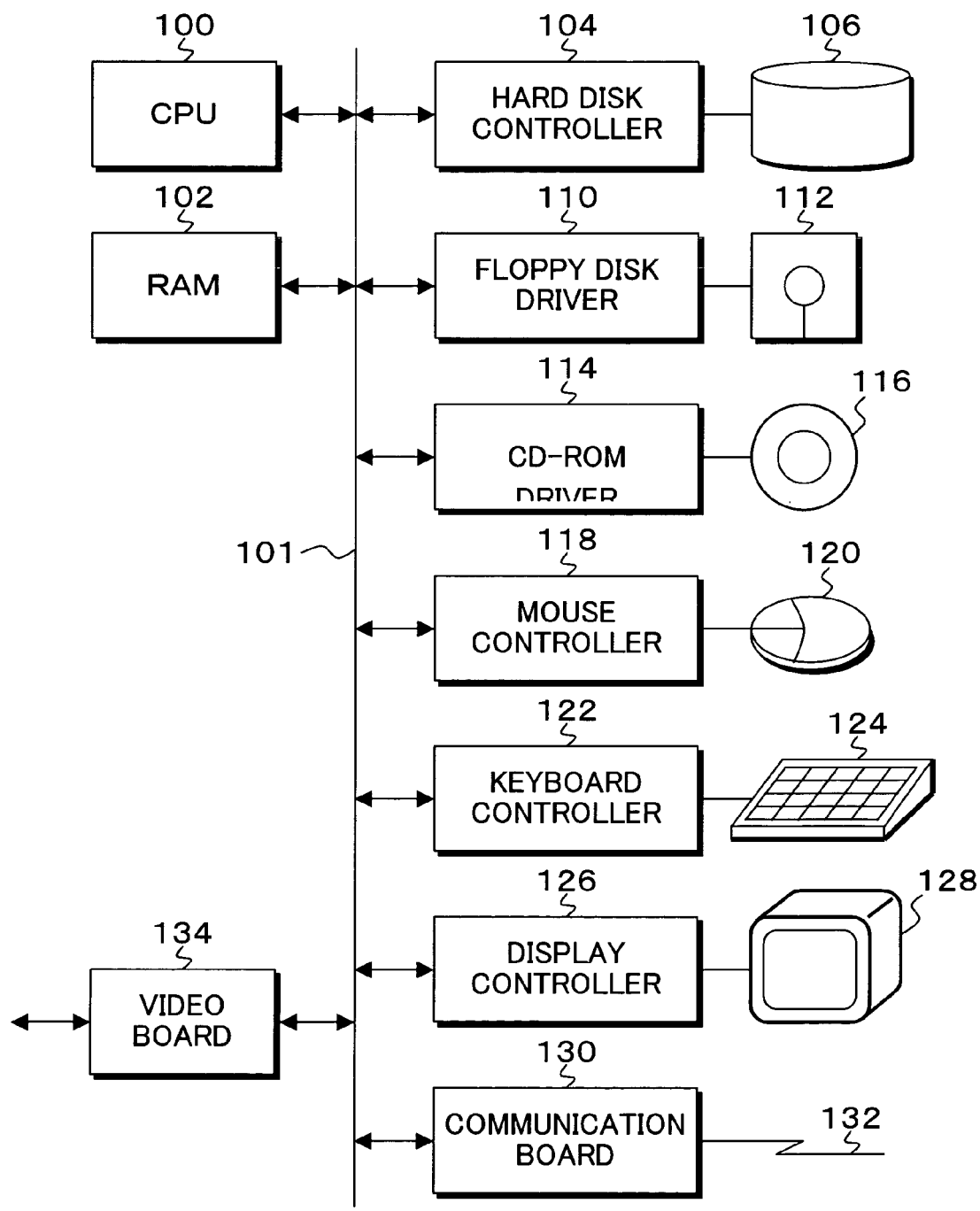
FIG. 2 is a diagram for explaining hardware resources for realizing the video program broadcasting apparatus according to the present invention.

The video program broadcasting apparatus 10 in FIG. 1 is realized by hardware resources of a computer shown in, e.g., FIG. 2. In the computer in FIG. 2, a RAM 102, a hard disk driver (software) 104, a floppy disk driver (software) 110, a CD-ROM driver (software) 114, a mouse controller 118, a keyboard controller 122, a display controller 126, a communication board, and a video board 134 are connected to a bus 101 of a CPU 100. The hard disk driver (software) 104 is connected to a hard disk drive 106 and loads an application program which invisibly embeds use information such as a URL inherent in a video program in image data by steganography. The hard disk driver 104 calls out the application program from the hard disk drive 106 at the start of the computer, develops the application program on the RAM 102, and causes the CPU 100 to execute the application program. A floppy disk drive (hardware) 112 is connected to the hard disk driver 104, so that data can be read and written in a floppy disk (R). A CD drive (hardware) 116 is connected to the CD-ROM driver 114, so that data or a program stored in a CD can be read. The mouse controller 118 transmits an input operation of the mouse 120 to the CPU 100.

The keyboard controller 122 transmits an input operation of a keyboard 124 to the CPU 100. The display controller 126 displays a screen on a display unit 128. A communication board 130 uses a communication circuit 132 to communicate with another computer. The video board 134 incorporates a decoder, a video memory, and an encoder. The video board 134 inputs a movie stream obtained by a video program broadcast in the decoder to demodulate image data and embeds use information such as a URL inherent in a video program by steganography in units of screens such that the application program is executed by the CPU 100 while developing the application program. Thereafter, the image data is converted into the movie stream, and the movie stream is output. As the video board 134, a video board which can cope with a signal format of a movie stream, i.e., NTSC format, MPEG format, or the like is used.

Figure 3:
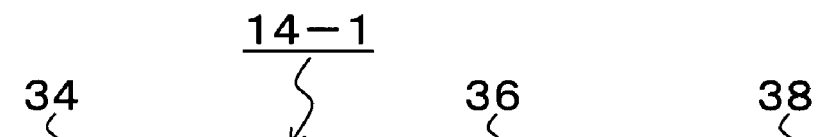
FIG. 3 is a diagram for explaining a video program table used in FIG. 1.

FIG. 3 shows an example of a video program table 14-1 stored in the program table storage unit 14 of the video program broadcasting apparatus 10 in FIG. 1. The video program table 14-1 stores a program name 34, a start time 36, and an end time 38 therein. In this example, video programs 1 to 8 are exemplified. For descriptive convenience, it is assumed that video programs 1 to 8 are continuous video programs. However, like commercial video programs, actual broadcast programs may employ separated time zones like.

FIG. 4 is a diagram for explaining a program-URL matching table 16-1 stored in the program-URL matching table storage unit 16 of the video program broadcasting apparatus 10 in FIG. 1. The program-URL matching table 16-1 is constituted by video program names 40 and URLs 42. For example, URLs 1 to 8 of the homepages of sponsors which present the video programs are stored in relationship to video programs 1 to 8.

Figure 5:
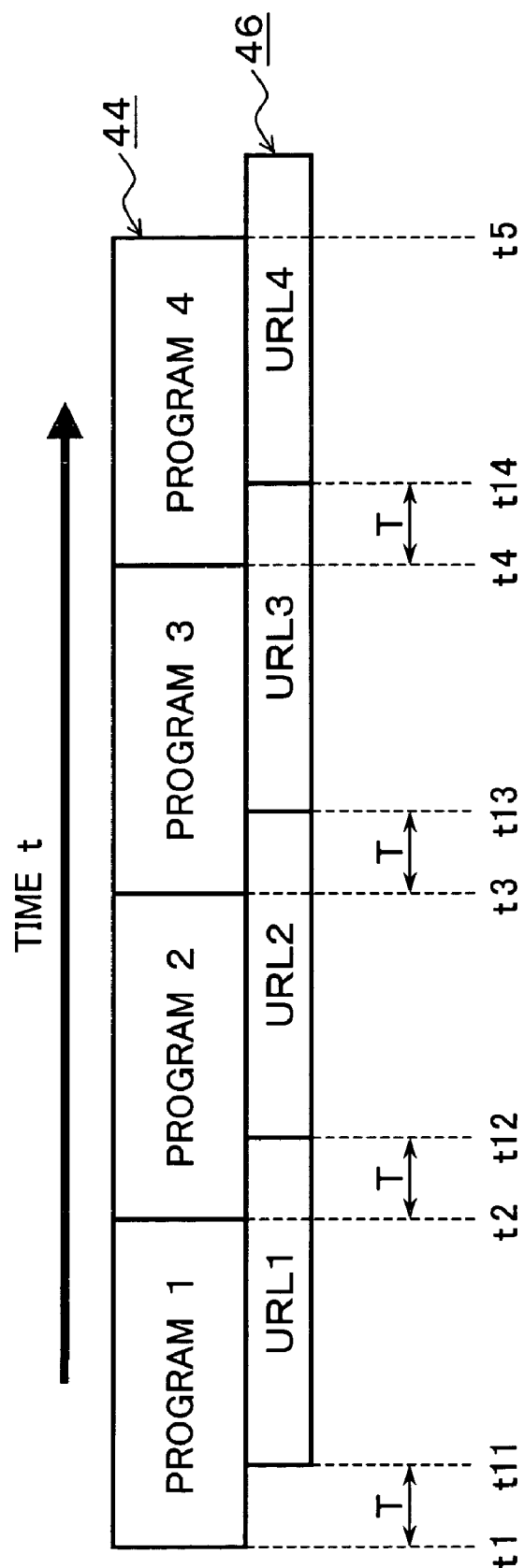
FIG. 5 is a time chart of an embodiment of a URL embedding process according to an embodiment in FIG. 1.

FIG. 5 is a time chart of a URL embedding process obtained by the URL generation unit 18 and the steganography encoder 20 which are arranged in the video program broadcasting apparatus 10 in FIG. 1.

In FIG. 5, if video program 1, video program 2, video program 3, and video program 4 are sequentially broadcasted as a movie stream 44, the start times and the end times of programs 1 to 4 are obtained from the video program table 14-1 in FIG. 3. For this reason, URLs matched to the video programs are embedded in relationship to the start times and the end times. More specifically, a URL embedding process 46 is performed by the following manner. That is, URLs acquired from video programs which are being broadcasted at the present are respectively embedded as URL 1, URL 2, URL 3, and URL 4 in start times t1, t2, t3, and t4 of video programs 1 to 4 of the movie stream 44 at times t11, t12, t13, and t14 set a predetermined period of time T after the starts of the video programs. The URL embedding process 46 will be considered with reference to each video program. For example, with respect to video program 1, URL 1 is not embedded in a period of time from start time t1 to time t11 set the predetermined period of time after start time t1, embedding of URL 1 is started from time t11, and the embedding of URL 1 is performed until time t12 the predetermined period of time T after start time t2 of the next video program 2. Similarly, with respect to video program 2, video program 3, and video program 4, the URLs of first previous video programs are displayed until times t12, t13, and t14 set the predetermined period of time T after start time t2, t3, and t4. Thereafter, the URLs are switched to the URLs of video programs which are being broadcasted at the present. In this manner, the URL of a first previous video program is extensionally embedded in the start part of the next video program to prevent the URL from failing to acquire by timing delay of photographing. When a user watches a video program which is being broadcasted at the present and photographs a video program screen by a mobile telephone having a camera to acquire the URL of the video program, the screen may be switched to the screen of the next video program in the photographing operation. In order to avoid this, the URL of the previous video program is embedded in the start part of the next video program to prevent the URL from failing to acquire by timing delay of photographing.

Figure 6:
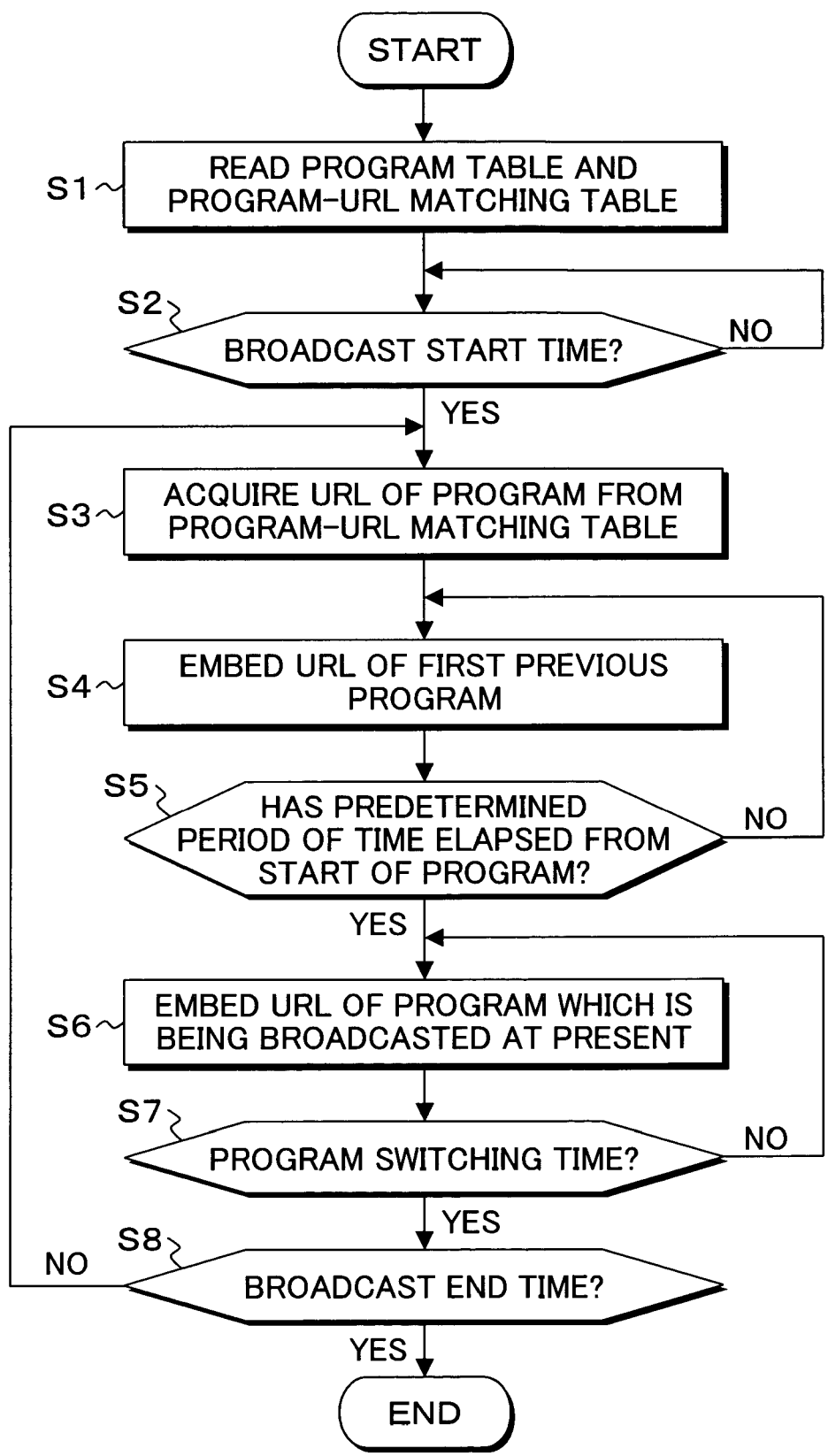
FIG. 6 is a flow chart for realizing the URL embedding process in FIG. 5 by the video program broadcasting apparatus in FIG. 1.

FIG. 6 is a flow chart of a process operation of the video program broadcasting apparatus 10 in FIG. 1 for realizing the URL embedding process 46 in FIG. 5. The flow chart shows procedures of a video program broadcasting program according to the present invention. In FIG. 6, in step S1, the URL generation unit 18 reads the video program table 14-1 as shown in FIG. 3 and the program-URL matching table 16-1 as shown in FIG. 4 through the program table storage unit 14 and the program-URL matching table storage unit 16. In the next step S2, present time information from the timer unit 12 is compared with the start time of the first video program to check whether the time is broadcast start time or not.

When it is the broadcast start time, a broadcast signal of a broadcast program starts to be input to the video program broadcasting apparatus 10.

For this reason, the URL of a video program which is being broadcasted at the present is acquired from the program-URL matching table 16-1 in step S3, the CPU 100 shifts to step S4. In step S4, the URL of the first previous video program is invisibly embedded by steganography in broadcast image data of the video program which is being broadcasted at the present. However, the URL of the first video program is not embedded because the first video program has no first previous video program. When a predetermined period of time has elapsed after the start of the video program in step S5, the CPU 100 shifts to step S6 to embed the URL in the broadcast image data of the program which is being broadcasted at the present by steganography. It is checked in the next step S7 whether it is broadcast end time or not. When it is the switching time, it is checked in step S8 whether it is broadcast end time or not. Since it is not the end time, the CPU 100 returns to step S3 to acquire the URL of the next video program, and the CPU 100 keeps the URL of the video program before the switching, i.e., the first previous video program being embedded.

When a predetermined period of time has elapsed after the start of the program, the CPU 100 shifts from step S5 to step S6, and the URL is embedded in the image data of the video program which is being broadcasted at the present. When it is the last video program switching time in step S7, broadcast end time is determined in step S8, and a series of processes are ended.

Figure 7:
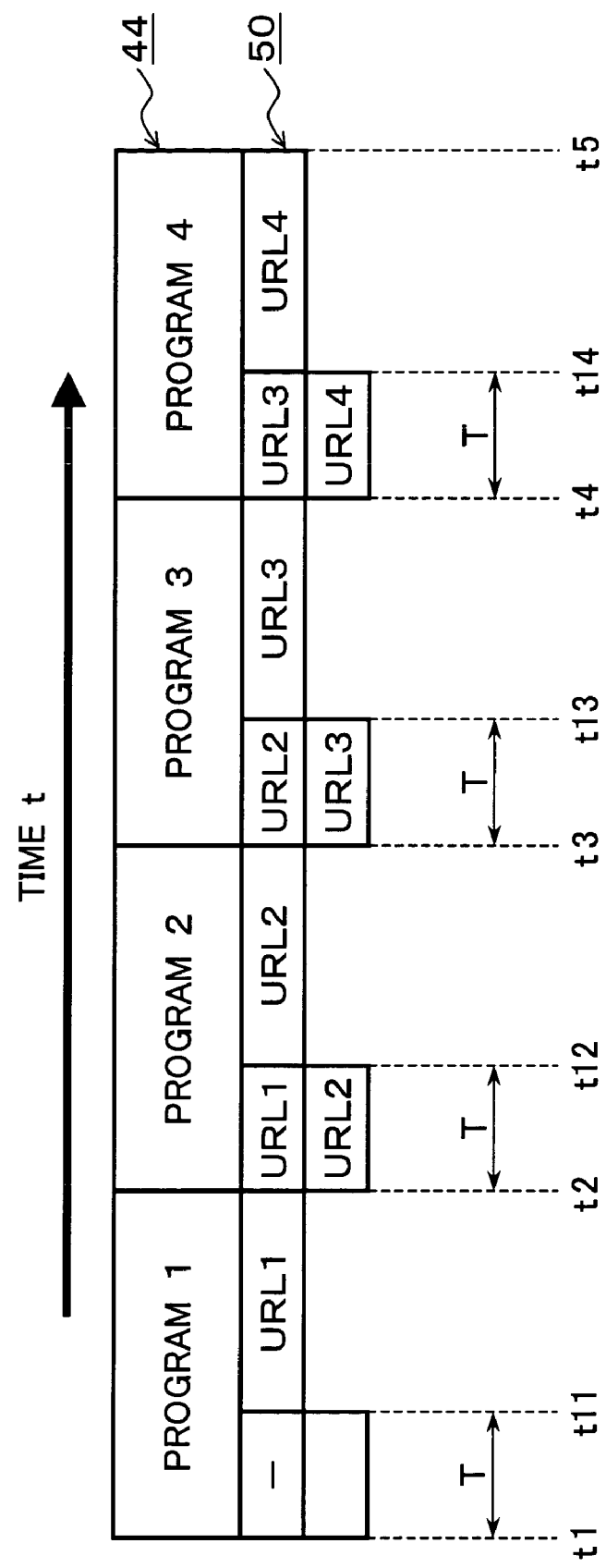
FIG. 7 is a time chart of another embodiment of a URL embedding process according to the embodiment in FIG. 1.

FIG. 7 is a time chart showing another embodiment of the URL embedding process performed by the video program broadcasting apparatus 10 in FIG. 1. In this embodiment, as a URL embedding process 50 for video programs 1 to 4 broadcasted as the movie stream 44, two URLs of a first previous video program and a video program which is being broadcasted at the present are respectively embedded the predetermined period of time T after start times t1, t2, t3, and t4 of programs 1 to 4, and the URL of only the video program which is being broadcasted at the present is embedded in the remaining time zone. For example, with respect to video program 2, URL 1 of the first previous video program 1 and URL 2 of video program 1 which is being broadcasted at the present are embedded in a period of time T from broadcast start time t2 to time t12.

URL 2 of only video program 2 which is being broadcasted at the present is embedded in a time zone from time t12 to t3. In this manner, if time delay occurs, the URL of the first previous video program can be reliably acquired by photographing a screen with the camera of the mobile telephone at a switching part of video programs. In addition, the URL of the video program which is being broadcasted can be simultaneously acquired.

Figure 8:
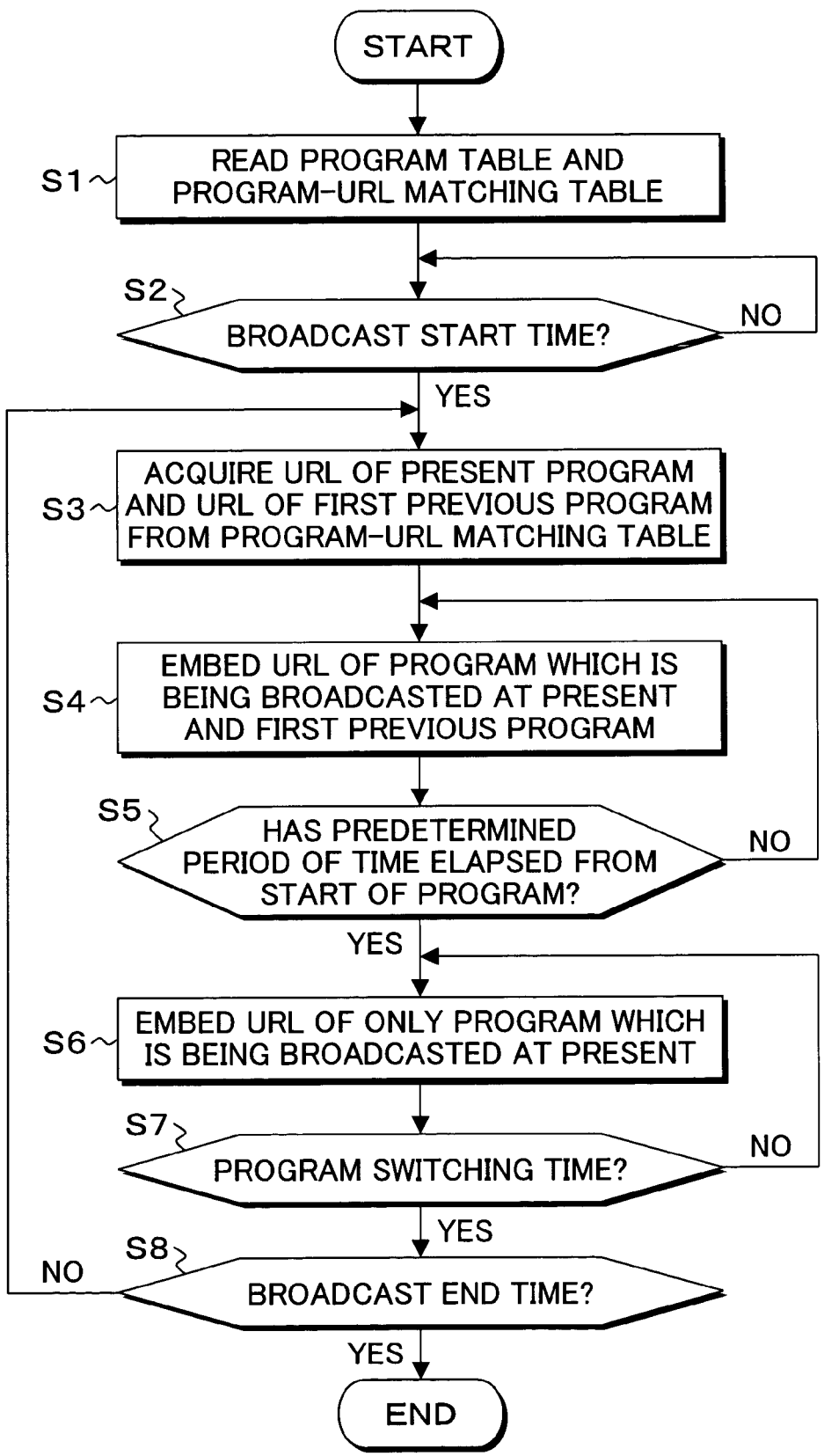
FIG. 8 is a flow chart for realizing the URL embedding process by the video program broadcasting apparatus in FIG. 1.

FIG. 8 is a flow chart of a process operation of the video program broadcasting apparatus 10 in FIG. 1 for realizing the URL embedding process 50 in FIG. 7. In FIG. 8, the video program table and the program-URL matching table are read in step S1, and it is checked in step S2 whether it is broadcast start time or not. When it is the broadcast start time, the URLs of the present video program and the first previous video program are acquired from the program-URL matching table in step S3. Since the first video program has no URL of the first previous video program, only the URL of the video program which is being broadcasted at the present is displayed. When a predetermined period of time has elapsed after the start of the video program in step S5, the CPU 100 shifts to step S6 to embed the URL of the video program which is being broadcasted at the present. It is checked in the next step S7 whether it is video program switching time or not.

When it is the switching time, it is checked in step S8 whether it is broadcast end time or not. Since it is not the end time, the CPU 100 returns to step S3 to acquire the URLs of the present video program and the first previous video program from the program-URL matching table. With respect to the second video program, the URL of the video program which is being broadcasted at the present and the URL of the first previous video program are embedded in the image data of the video program which is being broadcasted at the present in step S4. When a predetermined period of time has been elapsed in step S5, the current operation is switched to an operation for embedding only the URL of the video program which is being broadcasted at the present in step S6. The processes in steps S3 to S8 are repeated until the end of the broadcast.

Figure 9:
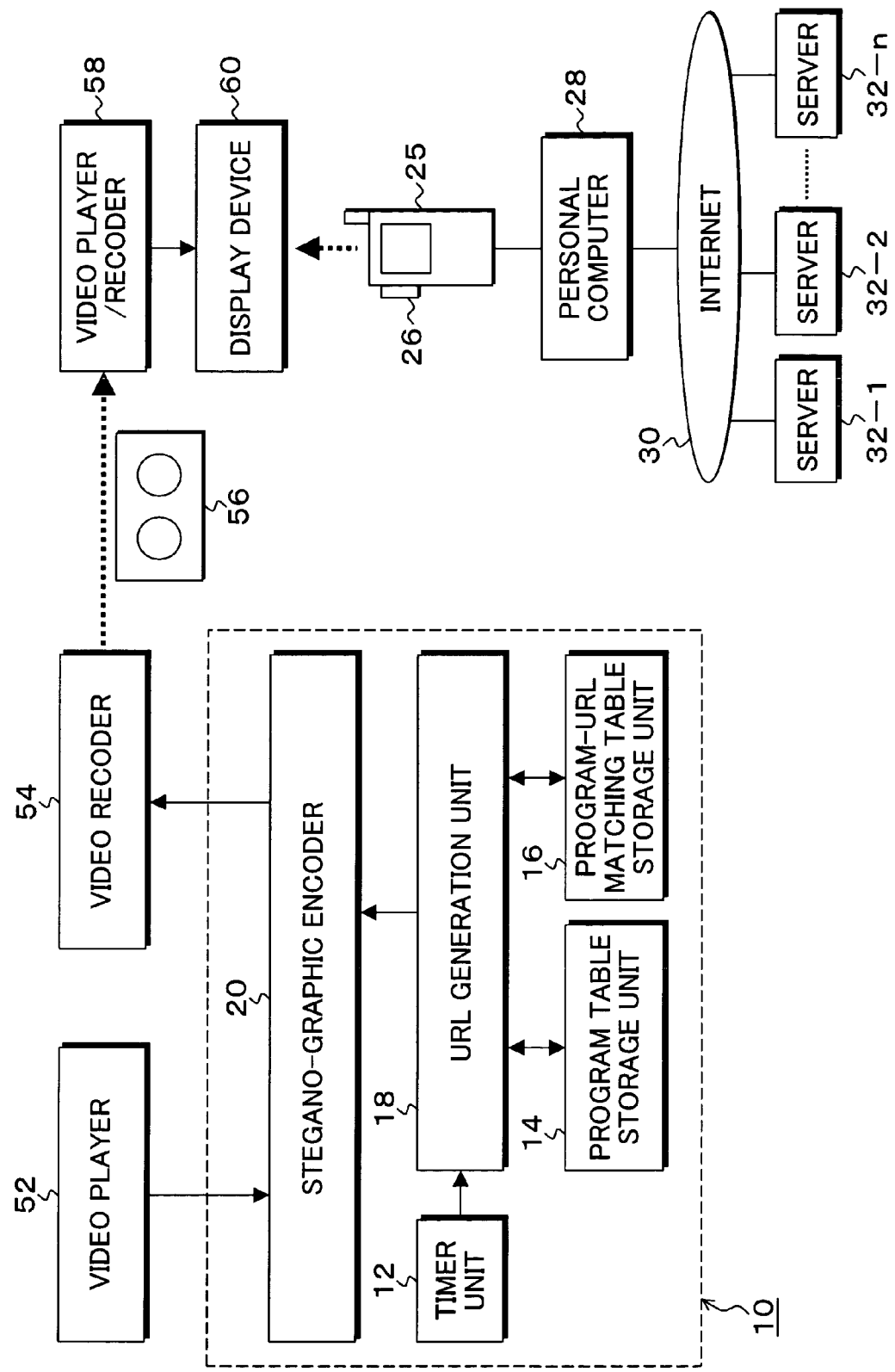
FIG. 9 is a diagram for explaining an embodiment of a video program broadcasting apparatus according to the present invention in which a URL is embedded by video edition and a system environment.

FIG. 9 shows another embodiment of a system environment to which the video program broadcasting apparatus according to the present invention. This embodiment exemplifies a case in which a video program is edited on a recording medium such as a video tape to be reproduced. In FIG. 9, the video program broadcasting apparatus 10 is the same as that of the embodiment in FIG. 1. The video program broadcasting apparatus 10 is constituted by a timer unit 12, a program table storage unit 14, a program-URL matching table storage unit 16, a URL generation unit 18, and a steganography encoder 20.

As a concrete embedding method performed by the steganography encoder 20, a method disclosed in, e.g., a drawing of the specification of U.S. Pat. No. 5,841,978 is used. As a matter of course, other known embedding methods using steganography can also be used. A broadcast signal from a video cassette player 52 in which a video cassette tape on which edited data is recorded is set is input to the video program broadcasting apparatus 10. For this reason, a program table and a program-URL matching table corresponding to the edited contents of the video cassette tape to be reproduced by the video cassette player 52 are set in advance in the program table storage unit 14 and the program-URL matching table storage unit 16 of the video program broadcasting apparatus 10, respectively. For this reason, the video program broadcasting apparatus 10 performs a URL embedding operation according to the process of the URL embedding process 46 using the scheme in FIG. 5 or the URL embedding process 50 in FIG. 7 to the broadcast signal of the video program reproduced by the video cassette player 52, and the broadcast signal in which the URL is embedded is recorded by a video cassette recorder 54. A video cassette tape 56 of a video program which is recorded by the video cassette recorder 54 and in which the URL is embedded is set in a display equipment using another video cassette player 58, e.g., a video cassette player 58 of a video broadcast equipment which is installed at a place such as a station or a shopping mall where persons gather to play a commercial video program, and the video program in which the URL is embedded is broadcasted and displayed on a display device 60.

For this reason, a person who wants to acquire a URL on the display device 60 photographs a video program screen of the display device 60 by her/his mobile telephone 25 having a camera 26. She/He connects the mobile telephone 25 to her/his personal computer 28 at home, restores the URL from the photographed video program screen by using a restoring program of steganography installed in the personal computer 28 in advance. She/He accesses a server corresponding to the URL of the video program in servers 32-1 to 32-n through the Internet 30 and can browse the homepage of the URL.]

Figure 10:
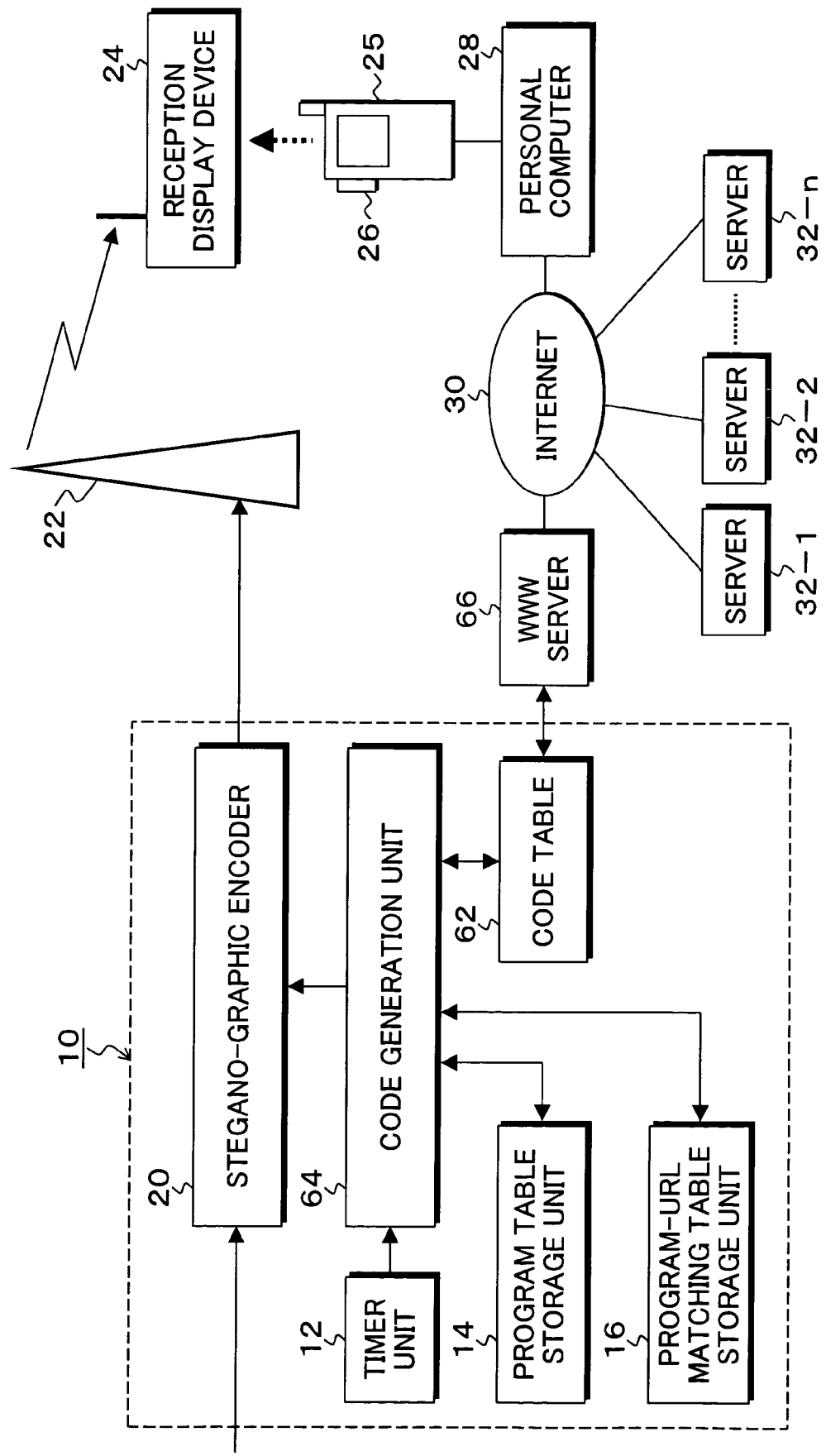
FIG. 10 is a diagram for explaining an embodiment of a video program broadcasting apparatus according to the present invention in which a code matching to a URL is embedded in a video program broadcast and a system environment.

FIG. 10 is a diagram for explaining a video program broadcasting system showing another embodiment of the video program broadcasting apparatus according to the present invention. The video program broadcasting apparatus 10 of this embodiment invisibly embeds the URL of a video program in the embodiment in FIG. 1. The embodiment in FIG. 11 has the following characteristic feature.

That is, the video program broadcasting apparatus 10 converts a URL into a simple code without directly embedding the URL and embeds the code in a video program screen. In FIG. 10, the video program broadcasting apparatus 10 is constituted by a timer unit 12, a program table storage unit 14, a program-URL matching table storage unit 16, a code table 62, a code generation unit 64, and a steganography encoder 20. More specifically, a code table 62 is additionally arranged in the configuration of the embodiment in FIG. 1. In accordance with the arrangement of the code table 62, the code generation unit 64 has functions different from those of the URL generation unit 18.

As the steganography encoder 20, as in the above embodiment, a method disclosed in a drawing of the specification of U.S. Pat. No. 5,841,978 is used. A broadcast signal of a video program which has been edited is input to the video program broadcasting apparatus 10. A code matched to the URL of the video program is invisibly embedded in the broadcast signal by steganography. Thereafter, the broadcast signal is transmitted from a television transmission equipment 22 as a television electric wave. On a reception side, when a broadcast video program is received by a receiving display device 24 such as television receiver, a user photographs a video program screen the URL of which is desired by a camera 26 of a mobile telephone 25. The mobile telephone 25 is connected to a personal computer 28 to acquire the code of the video program embedded in the photographed screen by a restoring program of steganography. When the personal computer 28 acquires the code of the video program, the personal computer 28 accesses a WWW server 66 arranged in relation to the video program broadcasting apparatus 10 through the Internet 30 to request to convert the code into a URL. In response to the conversion request from the user side, the WWW server 66 acquires the URL matched to the requested code with reference to the code table 62 of the video program broadcasting apparatus 10 to respond to the personal computer 28. In this manner, the user who acquires the URL matched to the code from the WWW server 66 accesses the corresponding URL of servers 32-1 to 32-n which present services corresponding to video program URLs, e.g., homepages. The use can use the homepage or the like. In this case, the video program table of the program table storage unit 14 arranged in the video program broadcasting apparatus 10 in FIG. 10 is the same as that in FIG. 4, and the program-URL matching table arranged in the program-URL matching table storage unit 16 is the same as that in FIG. 5. On the other hand, the code table 62, as shown in, e.g., FIG. 11A, is constituted by video program codes 72 and video program URLs 74. As the video program codes 72, eight codes 1 to 8 the number of which is smaller than the number of video programs to be broadcasted are prepared. Each time a video program is broadcasted, an unused code 76 represented by "*" is searched for and acquired. A URL acquired from the program-URL matching table is described in the column for the video program URLs 74.

FIG. 11A shows the code table 62 which is obtained when present video program 6 is being broadcasted in broadcast of video programs 1 to 6 as indicated by a pointer 78. In this state, code 7 and code 8 are set as the unused codes 76. FIG. 11B shows a code table 62-1 obtained when video program 6 of he pointer 78 in FIG. 11A matched to code 6 is changed into video program 7 and then changed into video program 8. At this time, registrations in the column of the video program URLs 74 corresponding to codes 1 and 2 embedded in video programs 1 and 2 which have been broadcasted are deleted, and the codes 1 and 2 are set as unused codes 76. In this manner, the code table 62 acquires an unused code at the start of a video program and describes the corresponding URL. After a predetermined period of time has elapsed after the end of the video program, the URL is deleted to set the code matched to the URL as an unused code.

The small number of codes are repeatedly used by reusing the codes.

Figure 12:
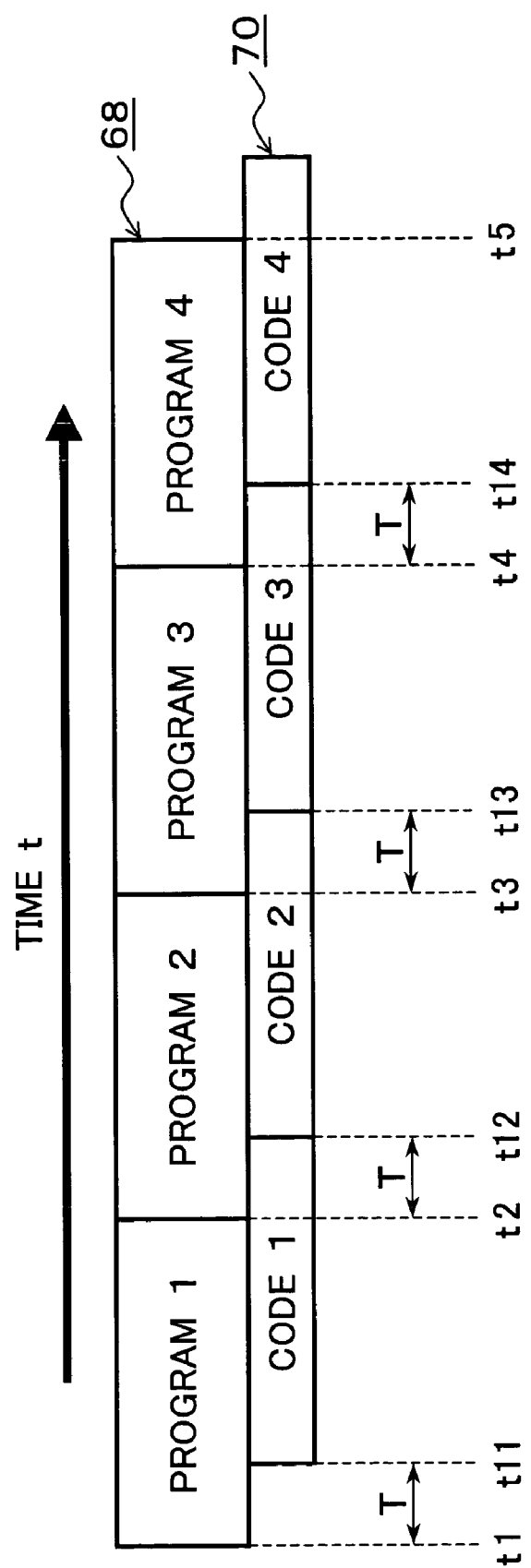
FIG. 12 is a time chart of an embodiment of a code embedding process according to the embodiment in FIG. 10.

FIG. 12 is a time chart of a code embedding process performed by the video program broadcasting apparatus 10 in FIG. 10. In the embodiment in FIG. 12, with respect to the broadcast signals of video programs 1 to 4 given as a movie stream 68, the same embedding process as that in the embodiment in FIG. 5 is performed as a code embedding process 70 corresponding to video programs and URLs. More specifically, for the predetermined period of time T from start times t1, t2, t3, and t4 of video programs 1 to 4, the codes of the video programs are not embedded. The codes of the video program which is being broadcasted at the present are embedded in relation to video programs 1 to 4 like codes 1 to 4 from times t11, t12, t13, and t14 the predetermined period of time T. Even though the video program is ended and switched to the next video program, the code of the previous video program is continuously embedded for the predetermined period of time. In this manner, failing to acquire a code caused by timing delay when a code-embedded screen is photographed at the video program switching part can be prevented.

Figure 13:
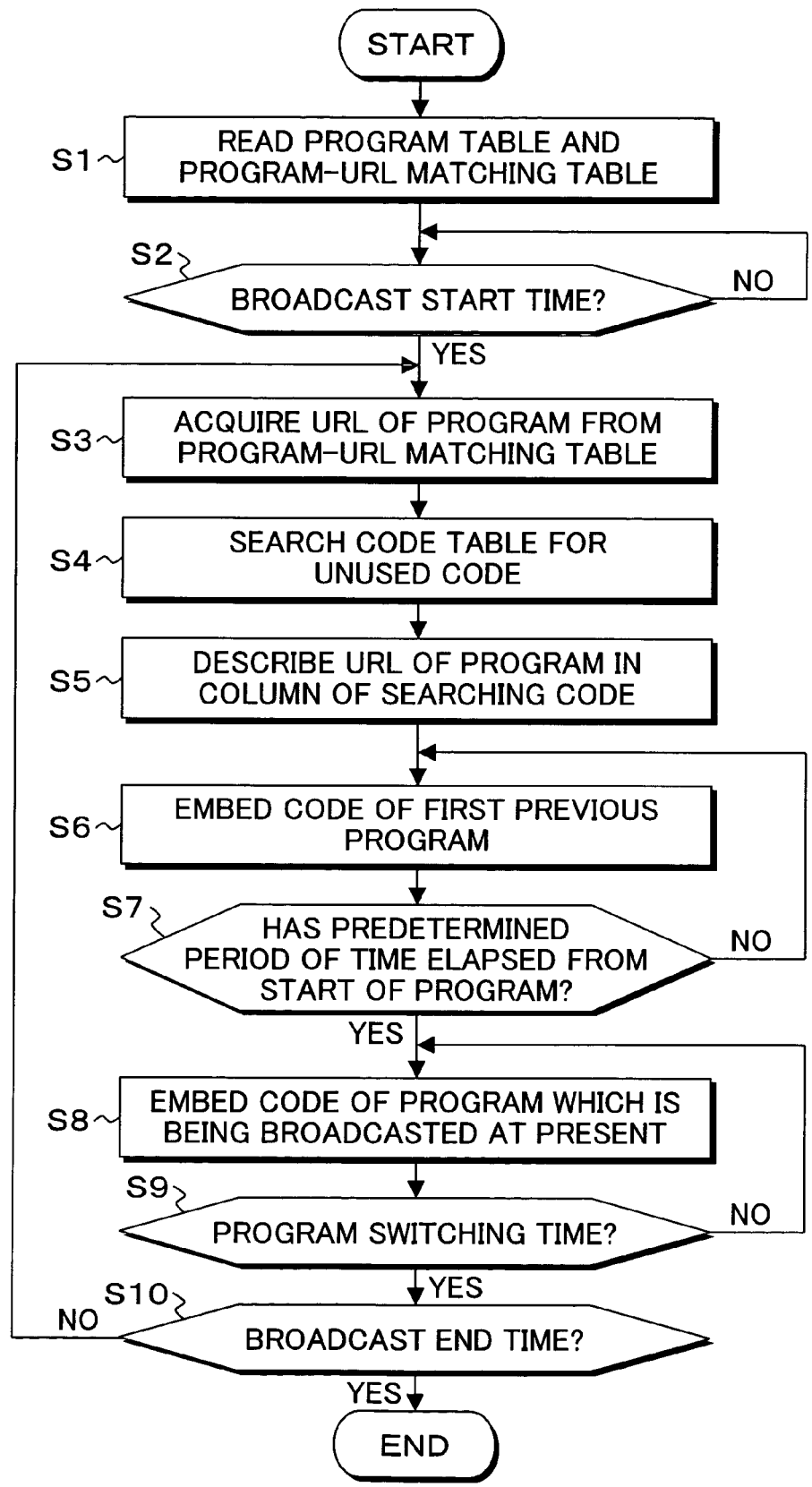
FIG. 13 is a flow chart for realizing the code embedding process in FIG. 12 by the video program broadcasting apparatus in FIG. 10.

FIG. 13 is a flow chart of a process operation in the video program broadcasting apparatus 10 in FIG. 10 for realizing the code embedding process 70 in FIG. 12. The video program table and the program-URL matching table are read in step S1, and it is checked in step S2 whether it is broadband start time. When it is broadband start time of the first video program, the URL of the video program is acquired from the program-URL matching table in step S3. The code table 62 is searched for an unused code in step S4, the URL of the video program is described in the column of the unused code obtained by the searching in step S5. In step S6, the code of the first previous video program is embedded in broadcast image data by steganography. However, since there is no first previous video program for the first video program, the code is not embedded.

When a predetermined period of time has elapsed from the start of the video program in step S7, the CPU 100 shifts to step S8 to embed the code of the video program which is being broadcasted in the broadcast image data by steganography. In step S9, video program switching time is monitored. When it is the program switching time, it is checked in step S10 whether it is the broadcast end time or not.

If it is not the broadcast end time, the CPU 100 returns to step S3 to acquire the URL of the switched video program which is being broadcasted at the present. After an unused code is searched for in step S4, the URL of the switched video program which is being broadcasted is described in the column of the unused code obtained by the searching in step S5. In step S6, the code of the first previous video program is embedded in the video program which is being broadcasted at the present. When a predetermined period of time has elapsed from the start of the video program, the CPU 100 shifts from step S7 to step S8, and the embedding operation of the code of the first previous video program is switched to the embedding operation of the code of the video program which is being broadcasted at the present. The processes in steps S3 to S10 are repeated until the broadcast end time. In addition to the process routine for embedding a code, in the video program broadcasting apparatus 10 in FIG. 10, with respect to the code the URL of which is described in the code table 62 as shown in FIG. 11 and which is being used, an elapsed time from the end of the video program is monitored. When the elapsed time reaches a predetermined period of time, the described URL is deleted, and the code is released as an unused code to be reused.

Figure 14:
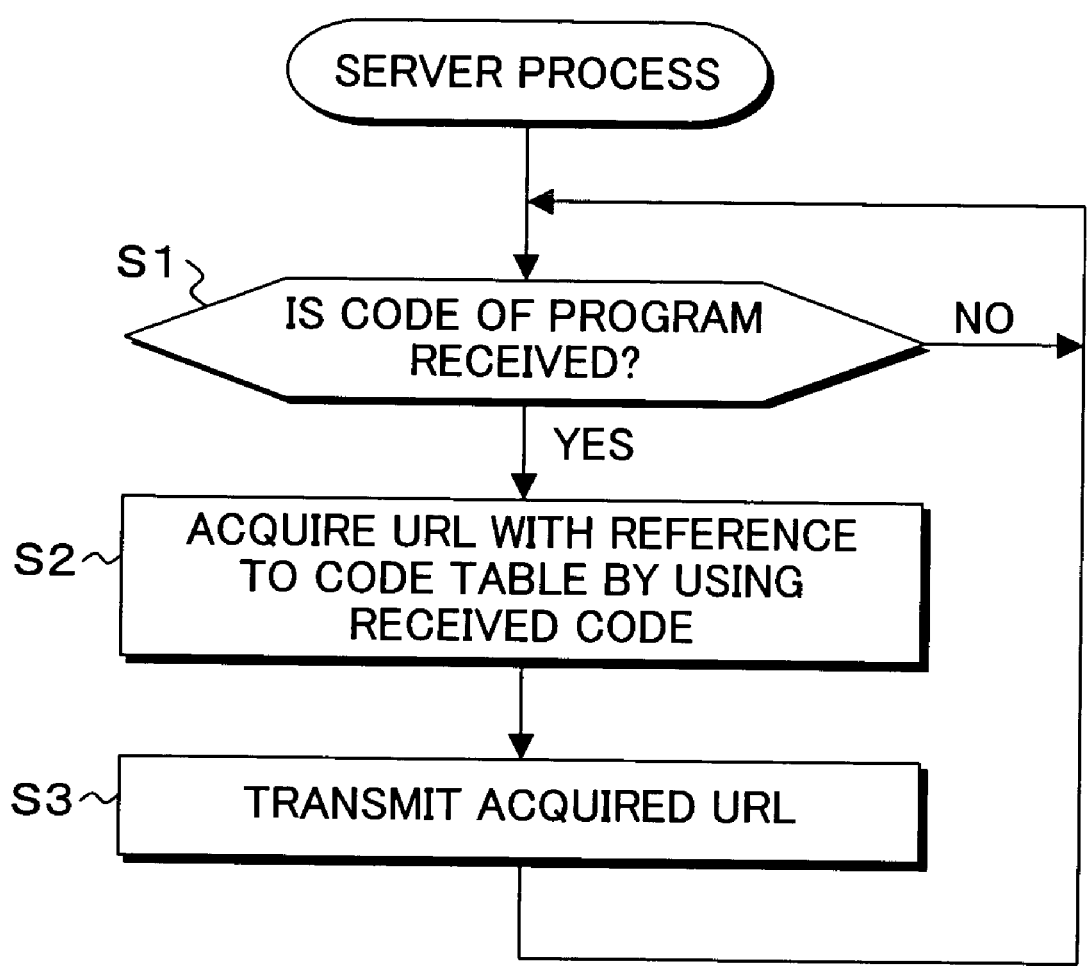
FIG. 14 is a flow chart of a code-URL conversion process performed by a WWW server in FIG. 10.

FIG. 14 is a flow chart of a server process of the WWW server 66 arranged in the video program broadcasting apparatus 10 in FIG. 10. In this server process, when a video program code is received from a user in step S1, a URL is acquired by the received code with reference to the code table 62 in step S2. In step S3, the acquired URL is transmitted. Conversion from a code into a URL by using the code table 62 in the WWW server 66 can be made for until the URL is deleted from the code a predetermined period of time after the end of the video program.

Figure 15:
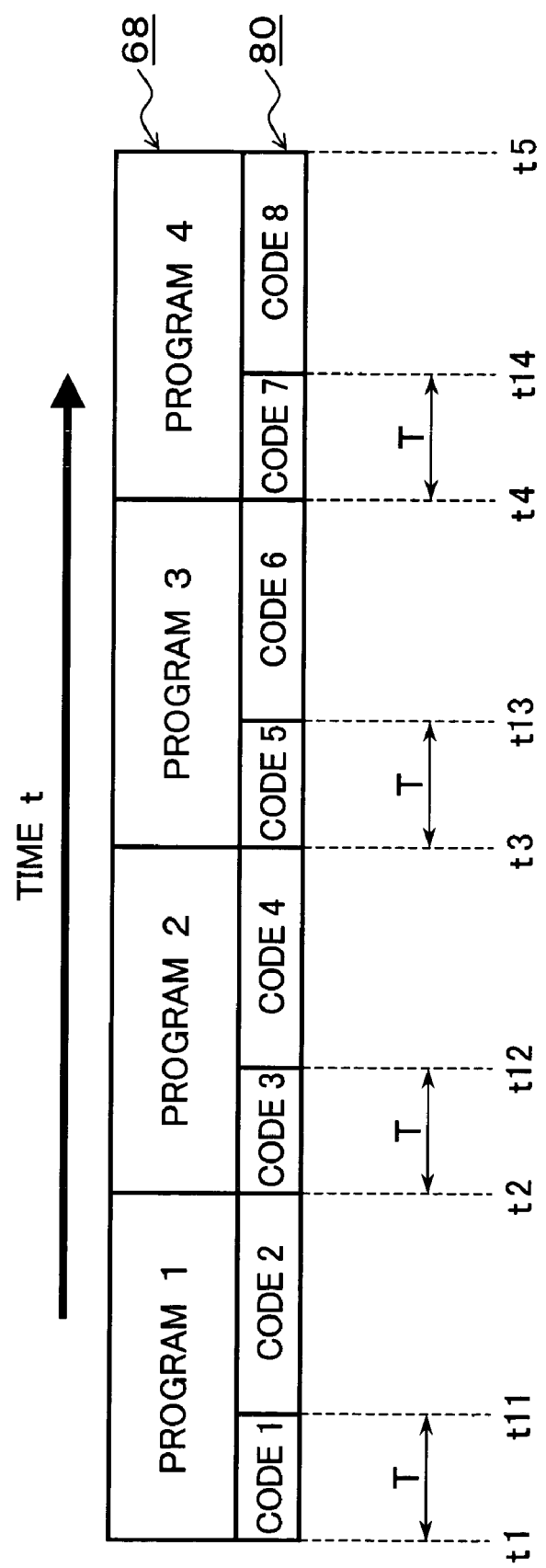
FIG. 15 is a time chart of another embodiment of a code embedding process according to the embodiment in FIG. 10.

FIG. 15 is a time chart of another embodiment of a code embedding process performed by the video program broadcasting apparatus 10 in FIG. 10. In FIG. 15, video program 1, video program 2, video program 3, and video program 4 are broadcasted as the movie stream 68. Accordingly, as a code embedding process 80, two codes 1 and 2 are embedded for video program 1, two codes 3 and 4 are embedded for video program 2, codes 5 and 6 are embedded for video program 3, and codes 7 and 8 are embedded for video program 4. Code 1, code 3, code 5, and code 7 obtained immediately after programs 1 to 4 are started are matched to the URL of the first previous video program and the URLs of the video program which is being broadcasted at the present. Code 1, code 4, code 6, and code 8 obtained the predetermined period of time T after the start of the broadcast are matched to the URLs of the video program which is being broadcasted at the present.

FIGS. 16A and 16B show a diagram for explaining the code table 62 for realizing the code embedding process 80 in FIG. 15. This code table 62 set video program codes 72, present video program URLs 82, and previous video program URLs 84. As the video program codes 72, eight codes 1 to 8 are prepared as the video program codes 72. Two codes are allocated to one video program. For example, if video program 3 is being broadcasted as indicated by a pointer 85, codes 1 and 2 are allocated to video program 1, codes 3 and 4 are allocated to video program 2, and codes 5 and 6 are allocated to video program 3. Codes 7 and 8 for video program which has not been broadcasted are set as unused codes 86 as indicated by "*". With respect to codes 1 and 2 allocated to video program, URL 1 of the video program which is being broadcasted at the present and the URL of the first previous video program are allocated to the first code 1. However, since video program 1 is the first video program, the URL of the previous video program is not registered. Codes 3 and 4 allocated to the second video program 2, URL 2 of the video program which is being broadcasted at the present and URL 1 of the first previous video program are described for the first code 3. With respect to the next code 4, only URL 2 of video program 2 which is being broadcasted is described.

By using the code table 62 described above, as shown in the code embedding process 80 in FIG. 15, a screen is photographed until time t12 set the predetermined period of time T after start time t2 when video program 2 is being broadcasted, embedded code 3 can be acquired. After the code 3 is acquired, when the personal computer 28 accesses the WWW server 66 to make a code conversion request in FIG. 10, two URLs, i.e., URL 2 of the present video program and URL 1 of the previous video program are acquired from code 3 with reference to the code table 62 in FIGS. 16A and 16B to be able to respond to the user side. The user selects a necessary one of the acquired URLs of the two video programs, and can access the server of the homepage of the URL.

The code table 62 in FIGS. 16A and 16B deletes the description of the URL a predetermined period of time after the end of the video program to set the corresponding code as an unused, and reuses a limited number of codes.

Figure 17A:
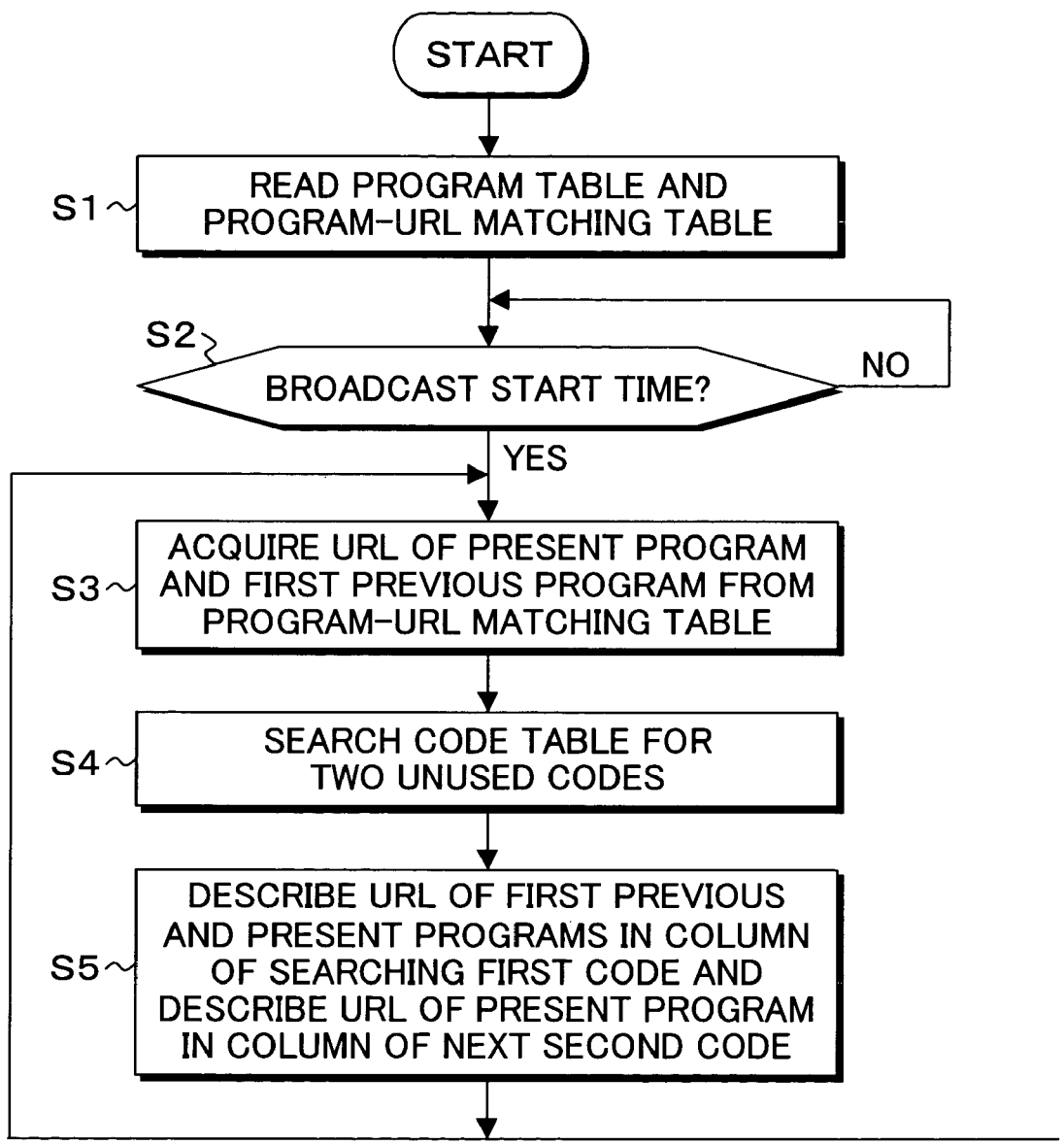
FIGS. 17A and 17B are flow charts for explaining the code embedding process in FIG. 15 performed by the video program broadcasting apparatus in FIG. 10.
Figure 17B:
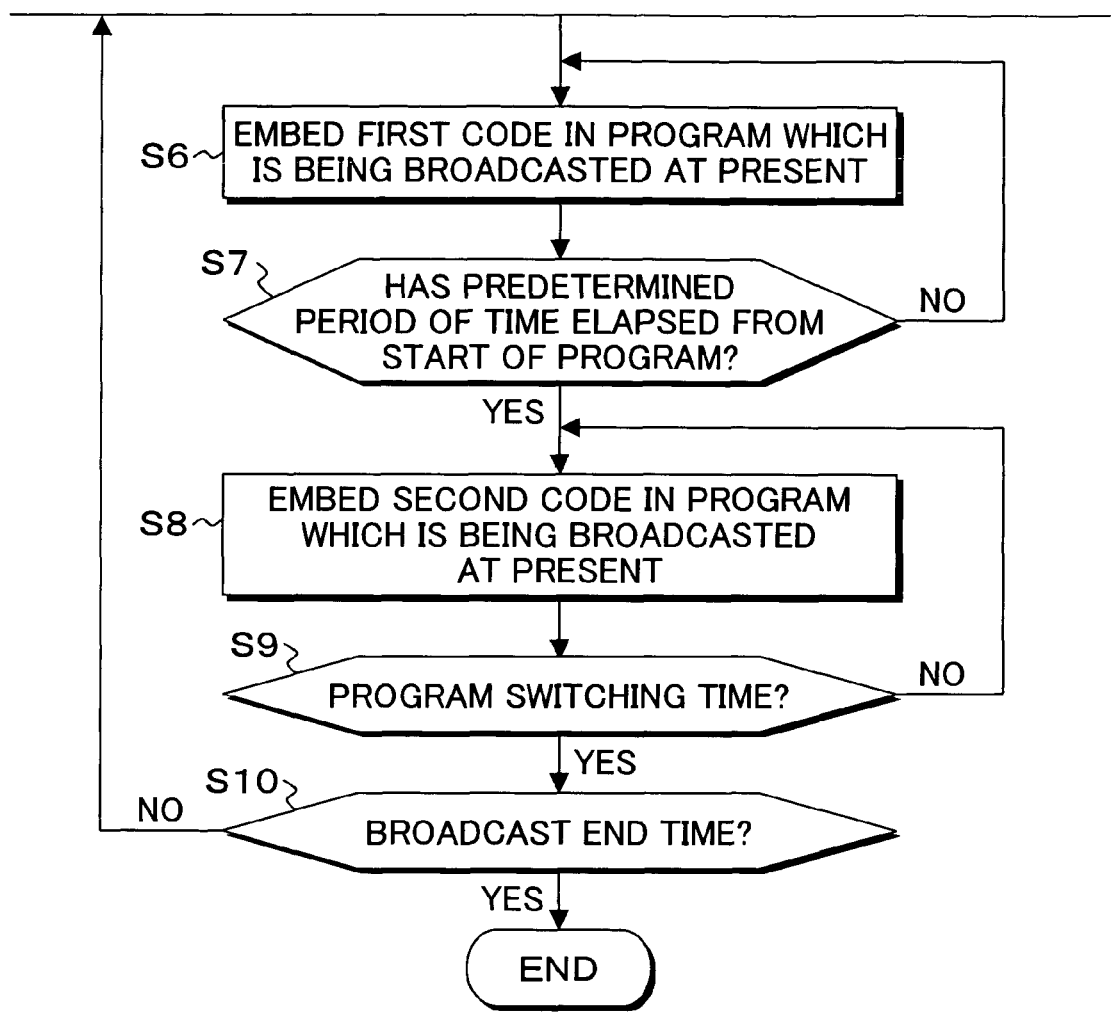

FIG. 17 is a flow chart of a process operation of the video program broadcasting apparatus 10 in FIG. 10 for realizing the code embedding process 80 in FIG. 15. In FIG. 17, the video program table and the program-URL matching table are read in step S1, and the URL of a video program which is being broadcasted at the present and the URL of the first previous video program are acquired from the program-URL matching table. However, since there is no first previous video program for the first video program, only the URL of the present video program is acquired. The code table 62 is searched for two unused codes in step S4, the URLs of the first previous video program and the present video program are described in the column of the first code obtained by the searching in step S5. The URL of the present video program is described in the column of the second code. In step S6, the first code corresponding to the code table in which the URLs of the first previous video program and the present video program are described is embedded in the image data of the video program which is being broadcasted at the present. When a predetermined period of time after the start of the video program in step S7, the second code, i.e., the second code in which the URL of the video program which is being broadcasted at the present is registered in the code table is embedded in the image data of broadcast image data in step S8. It is checked in step S9 whether it is video program switching time or not.

If it is not broadcast end time in step S11, the CPU 100 returns to step S3, like the next video program 2, the URLs of the present video program and the first previous video program are acquired.

The same processes are repeated until it is determined that it is the broadcast end time in step S11.

Figure 18:
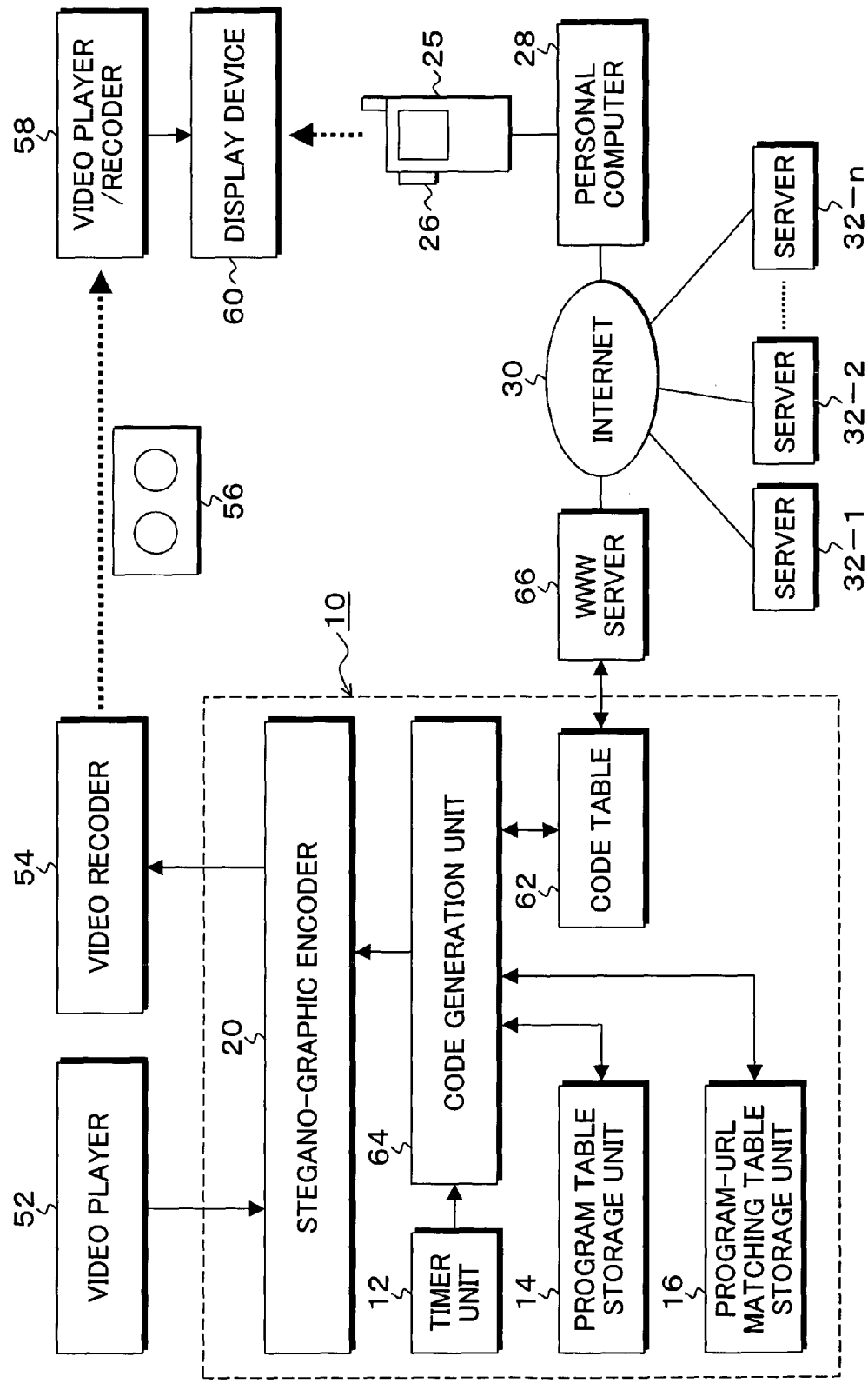
FIG. 18 is a diagram for explaining an embodiment of a video program broadcasting apparatus according to the present invention in which a code is embedded by video edition and a system environment.

FIG. 18 is a diagram for explaining another system environment using the video program broadcasting apparatus 10 which is the same as that in FIG. 10. Like the system environment in FIG. 9, the system environment in FIG. 19 does not target at broadcast equipment but video playing on a street.

In FIG. 18, the video program broadcasting apparatus 10 has the same configuration as that in FIG. 10, the code embedding process 70 in FIG. 12 or the code embedding process 80 in FIG. 15 are performed to a video program broadcast signal from the video cassette player 52, and the video program broadcast signal is recorded on the video cassette recorder 54. The video cassette tape 56 on which the signal is recorded by the video cassette recorder 54 and in which the code embedding process is performed is set in the video cassette player 58 and reproduced in the display device 60. The video program screen of the display device 60 is photographed by the camera 26 of the mobile telephone 25 held by a user, the code embedded in the screen is restored by the personal computer 28.

The user accesses the WWW server 66 through the Internet 30 to acquire a URL with reference to the code table 62. The user accesses any one of the servers 32-1 to 32-n corresponding to the URL, and can browse the homepage or the like of the user.

As has been described above, according to the present invention, a URL or a code which can be converted into a URL is invisibly embedded in a broadcast screen of a video program, and the video program screen is photographed to restore the embedded URL or code. A user can access the homepage of the URL or the code by using the URL or the code as video program use information. For this reason, defective access caused by a URL which is directly displayed on a video program screen at the present and which cannot be easily read can be eliminated. A user can acquire a URL by photographing a video program screen, and can use a homepage or the like.

In addition, since a URL or a code to be converted is invisibly embedded by steganography, a video program screen is not blocked by the URL or the like. In particular, a URL or a code which can be converted into a URL can be embedded in not only a screen of commercial video programs but also a screen of an essential video program except for a commercial program without blocking the contents of the screen.

The embodiments described above exemplify the case in which the video program broadcasting apparatus according to the present invention is applied to television broadcast equipment and video tape editing equipment. However, the present invention can also be applied to other appropriate video program broadcast equipment, system, and apparatus without any change.

The above embodiments exemplify the case in which a video cassette tape in which a URL or a code is embedded by a video cassette player is edited and reused by the video program broadcasting apparatus according to the present invention. In addition to the video cassette tape, an appropriate recording medium such as a DVD can also be used.

Furthermore, for a movie stream provided by using the Internet, a URL or a code can be embedded in a video program screen. In this case, since a broadcast screen of a video program can be directly received by the personal computer 28, the screen need not be photographed by the mobile telephone 25 having the camera 26 or the like. The received video program screen is downloaded by the personal computer 28 to directly acquire the URL of the video program or to acquire the URL by accessing the WWW server 66, so that the homepage corresponding to the video program can be used.

The embodiments described above exemplify the case in which the mobile telephone 25 having the camera 26 is used to photograph a video program screen in which a URL or a code is embedded. However, another mobile device with camera or an electronic still camera may be used.

The present invention is not limited to the above embodiments. The present invention includes appropriate changes without departing from the objects and advantages of the invention, and is not limited to numerical values described in the above embodiments.

The invention claimed is:

1. A video program broadcasting apparatus for sequentially broadcasting a plurality of video programs depending on a time schedule of a video program table, comprising:
    a matching table storage unit including a matching table of pieces of use information inherent in a plurality of video programs to be broadcasted; and
    a use information embedding unit acquiring use information of a video program which is being broadcasted at the present with reference to the matching table and invisibly embedding use information of the video program which is being broadcasted at the present and use information of video programs which were broadcasted in the past in a time zone of the video program which is being broadcasted at the present into broadcast image data by steganography, wherein
    the broadcast image data is picked up with a camera to make said use information acquirable, and
    the use information embedding unit invisibly embeds, in the time zone of the video program which is being broadcasted at the present after a predetermined time has lapsed from the beginning of the video program which is being broadcasted at the present, use information of a video program which was broadcasted immediately before and use information of the video program which is being broadcasted at the present, and invisibly embeds only the use information of the video program which is being broadcasted at the present in a remaining portion of the time zone of the video program which is being broadcasted at the present.

2. The apparatus according to claim 1,
    the use information storage unit stores a URL matching table of a URL inherent in a video program, and
    the use information embedding unit acquires the URL of the video program which is being broadcasted at the present with reference to the matching table and invisibly embeds the URL of the video program which is being broadcasted at the present and the URLs of video programs which were broadcasted in the time zone of the video program which is being broadcast at the present.

3. The apparatus according to claim 1,
    the use information storage unit stores a URL matching table of a URL inherent in a video program and a code matching table of a code inherent in the URL, and
    the use information embedding unit acquires a code matched to the URL of the video program which is being broadcasted at the present with reference to the URL matching table and the code matching table and invisibly embeds the code of the video program which is being broadcasted at the present and the codes of video programs which were broadcasted in the time zone of the video program which is being broadcasted at the present.

4. The video program broadcasting apparatus according to claim 3, the code matching table prepares codes the number of which is smaller than the number of video programs, and the use information embedding unit searches for an unused code to set a URL matched to a video program and recovers the URL into the unused code a predetermined period of time after the video program ends to reuse the unused code.

5. The apparatus according to claim 3 further comprises a server which acquires a URL with reference to the code matching table when a conversion request of the code is received from an outside circuit to respond to the outside circuit.

6. The apparatus according to claim 1, a signal of a broadcast program output from the use information embedding unit is transmitted to an outside circuit as a television broadcasting signal to cause the outside circuit to receive and display a video program screen, and the embedded use information is restored by photographing the received and displayed video program screen to cause the outside circuit to use the use information.

7. The apparatus according to claim 1, a signal of a broadcasting video program output from the use information embedding unit is recorded on a recording medium to cause another device to reproduce and display the video program screen, and the embedded use information is restored by photographing the received and displayed video program screen to cause the device to use the use information.

8. A video program broadcasting method comprising:
a video program broadcasting step of sequentially broadcasting a plurality of video programs depending on a time schedule of a video program table from a video program broadcasting apparatus; and
a use information embedding step of acquiring use information of a video program which is being broadcasted at the present with reference to a matching table in which use information inherent in the plurality of video programs are stored and invisibly embedding the use information of the video program which is being broadcasted at the present and use information of a video program which was broadcasted in the past in a time zone of the video program which is being broadcasted at the present into broadcast image data by steganography, wherein
the broadcast image data is picked up with a camera to make said use information acquirable, and
the use information embedding step invisibly embeds, in the time zone of the video program which is being broadcasted at the present after a predetermined time has lapsed from the beginning of the video program which is being broadcasted at the present, use information of a video program which was broadcasted immediately before and use information of the video program which is being broadcasted at the present, and invisibly embeds only the use information of the video program which is being broadcasted at the present in a remaining portion of the time zone of the video program which is being broadcasted at the present.

9. The method according to claim 8,
the URL matching table is a URL matching table in which a URL inherent in a video program is stored, and
the use information embedding step acquires the URL of the video program which is being broadcasted at the present with reference to the matching table and invisibly embeds the URL of the video program which is being broadcasted at the present and the URLs of video programs which were broadcasted in the time zone of the video program which is being broadcasted at the present.

10. The method according to claim 8,
the matching table includes a URL matching table of a URL inherent in a video program and a code matching table of a code inherent in the URL, and
the use information embedding step acquires a code matched to the URL of the video program which is being broadcasted at the present with reference to the URL matching table and the code matching table and invisibly embeds the code of the video program which is being broadcasted at the present and the codes of video programs which were broadcasted in the time zone of the video program which is being broadcasted at the present.

11. The method according to claim 10, the code matching table prepares codes the number of which is smaller than the number of video programs, and the use information embedding step searches for an unused code to set a URL matched to a video program and recovers the URL into the unused code a predetermined period of time after the video program ends to reuse the unused code.

12. The method according to claim 10 further comprises the step of acquiring a URL with reference to the code matching table when a conversion request of the code is received from an outside circuit to respond to the outside circuit.

13. The method according to claim 8, a signal of a broadcast program output in the use information embedding step is transmitted to an outside circuit as a television broadcasting signal to cause the outside circuit to receive and display a video program screen, and the embedded use information is restored by photographing the received and displayed video program screen to cause the outside circuit to use the use information.

14. The method according to claim 8, a signal of a broadcasting video program output in the use information embedding step is recorded on a recording medium to cause another device to reproduce and display the video program screen, and the embedded use information is restored by photographing the received and displayed video program screen to cause the device to use the use information.

15. A non-transitory computer readable storage medium which stores a program causing a computer to execute:
a video program broadcasting step of sequentially broadcasting a plurality of video programs depending on a time schedule of a video program table from a video program broadcasting apparatus; and
a use information embedding step of acquiring use information of a video program which is being broadcasted at the present with reference to a matching table in which use information inherent in the plurality of video programs are stored and invisibly embedding the use information of the video program which is being broadcasted at the present and use information of a video program which was broadcasted in the past in a time zone of the video program which is being broadcasted at the present into broadcast image data by steganography, wherein
the broadcast image data is picked up with a camera to make said use information acquirable, and
the use information embedding step invisibly embeds, in the time zone of the video program which is being broadcasted at the present after a predetermined time has lapsed from the beginning of the video program which is being broadcasted at the present, use information of a video program which was broadcasted immediately before and use information of the video program which is being broadcasted at the present, and invisibly embeds only the use information of the video program which is being broadcasted at the present in a remaining portion of the time zone of the video program which is being broadcasted at the present.

16. The non-transitory storage medium according to claim 15, the URL matching table is a URL matching table in which a URL inherent in a video program is stored, and the use information embedding step acquires the URL of the video program which is being broadcasted at the present with reference to the matching table and invisibly embeds the URL of the video program which is being broadcasted at the present and the URLs of video programs which were broadcasted in the time zone of the video program which is being broadcasted at the present.

17. The non-transitory storage medium according to claim 15, the matching table includes a URL matching table of a URL inherent in a video program and a code matching table of a code inherent in the URL, and the use information embedding step acquires a code matched to the URL of the video program which is being broadcasted at the present with reference to the URL matching table and the code matching table and invisibly embeds the code of the video program which is being broadcasted at the present and the codes of video programs which were broadcasted in the time zone of the video program which is being broadcasted at the present.

18. The non-transitory storage medium according to claim 17, the code matching table prepares codes the number of which is smaller than the number of video programs, and the use information embedding step searches for an unused code to set a URL matched to a video program and recovers the URL into the unused code a predetermined period of time after the video program ends to reuse the unused code.

19. The non-transitory storage medium broadcasting method according to claim 17 further comprises the step of acquiring a URL with reference to the code matching table when a conversion request of the code is received from an outside circuit to respond to the outside circuit.

20. The non-transitory storage medium according to claim 15, a signal of a broadcast program output in the use information embedding step is transmitted to an outside circuit as a television broadcasting signal to cause the outside circuit to receive and display a video program screen, and the embedded use information is restored by photographing the received and displayed video program screen to cause the outside circuit to use the use information.

21. The non-transitory storage medium according to claim 15, a signal of a broadcasting video program output in the use information embedding step is recorded on a recording medium to cause another device to reproduce and display the video program screen, and the embedded use information is restored by photographing the received and displayed video program screen to cause the device to use the use information.

22. A method comprising:
    invisibly embedding, by steganography, into image data of a video program which is being broadcasted at the present,
        in a time zone of the video program which is being broadcasted at the present after a predetermined time has lapsed from the beginning of the video program which is being broadcasted at the present, use information of a video program which was broadcasted immediately before and use information of the video program which is being broadcasted at the present, and
        in a remaining portion of the time zone of the video program which is being broadcasted at the present, only the use information of the video program which is being broadcasted at the present;
    photographing, with a camera, a screen on which the video program which is being broadcasted at the present is displayed, to thereby provide a photograph; and
    acquiring the steganography embedded use information from the photograph.

23. A method as in claim 22, further comprising:
    stopping the embedding of the use information of the video program that was broadcasted immediately before, after a predetermined time has lapsed from the beginning of the video program which is being broadcasted at the present.

24. A method as in claim 22, wherein the use information of the video program that was broadcasted immediately before is a URL of the video program that was broadcasted immediately before.

25. A method as in claim 22, wherein
    the use information of the video program that was broadcasted immediately before is a URL of the video program that was broadcasted immediately before, and
    the use information of the video program which is being broadcasted at the present is a URL of the video program which is being broadcasted at the present.

26. An apparatus comprising:
    means for invisibly embedding, by steganography, into image data of a video program which is being broadcasted at the present,
        in a time zone of the video program which is being broadcasted at the present after a predetermined time has lapsed from the beginning of the video program which is being broadcasted at the present, use information of a video program which was broadcasted immediately before and use information of the video program which is being broadcasted at the present, and
        in a remaining portion of the time zone of the video program which is being broadcasted at the present, only the use information of the video program which is being broadcasted at the present;
    means for photographing, with a camera, a screen on which the video program which is being broadcasted at the present is displayed, to thereby provide a photograph; and
    means for acquiring the steganography embedded use information from the photograph.

* * * * *

UNITED STATES PATENT AND TRADEMARK OFFICE
CERTIFICATE OF CORRECTION

| | | |
|---|---|---|
| PATENT NO. | : 7,861,276 B2 | Page 1 of 1 |
| APPLICATION NO. | : 10/642147 | |
| DATED | : December 28, 2010 | |
| INVENTOR(S) | : Jun Moroo | |

It is certified that error appears in the above-identified patent and that said Letters Patent is hereby corrected as shown below:

Column 14, Line 63, In Claim 4, delete "video program broadcasting".

Signed and Sealed this
Nineteenth Day of April, 2011

David J. Kappos
*Director of the United States Patent and Trademark Office*